(12) United States Patent
Hayashi et al.

(10) Patent No.: US 10,730,475 B2
(45) Date of Patent: Aug. 4, 2020

(54) VEHICLE SEATBELT DEVICE

(71) Applicant: TOYOTA JIDOSHA KABUSHIKI KAISHA, Toyota-shi, Aichi-ken (JP)

(72) Inventors: Shigeki Hayashi, Kasugai (JP);
Katsunori Yamada, Toyota (JP);
Tatsunori Andou, Nagakute (JP);
Mitsuaki Gotoh, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 16/103,368

(22) Filed: Aug. 14, 2018

(65) Prior Publication Data

US 2019/0106081 A1    Apr. 11, 2019

(30) Foreign Application Priority Data

Oct. 5, 2017 (JP) ................. 2017-195080

(51) Int. Cl.
*B60R 22/195* (2006.01)
*B60R 21/0134* (2006.01)
*B60R 21/0136* (2006.01)

(52) U.S. Cl.
CPC ...... *B60R 22/1951* (2013.01); *B60R 21/0134* (2013.01); *B60R 21/0136* (2013.01); *B60R 22/1952* (2013.01)

(58) Field of Classification Search
CPC ............ B60R 22/1951; B60R 21/0136; B60R 21/0134; B60R 22/195; B60R 22/1954; B60R 2022/4666
USPC ....................................................... 280/806
See application file for complete search history.

(56) References Cited

U.S. PATENT DOCUMENTS

| | | | |
|---|---|---|---|
| 2002/0135221 A1* | 9/2002 | Rogers, Jr. | B60R 22/1952 297/476 |
| 2004/0256850 A1 | 12/2004 | Yamaguchi | |
| 2005/0269148 A1 | 12/2005 | Koide et al. | |
| 2008/0319617 A1* | 12/2008 | Takemura | B60R 21/0132 701/45 |
| 2010/0057303 A1* | 3/2010 | Odate | B60R 22/46 701/45 |
| 2014/0061352 A1 | 3/2014 | Kim et al. | |
| 2015/0158590 A1* | 6/2015 | Gehret | B64D 11/062 297/474 |

(Continued)

FOREIGN PATENT DOCUMENTS

| | | | | |
|---|---|---|---|---|
| DE | 4230663 A1 * | 3/1994 | ......... | B60R 22/1952 |
| DE | 102010053063 A1 * | 6/2012 | ............. | B60R 22/46 |

(Continued)

*Primary Examiner* — Paul N Dickson
*Assistant Examiner* — Kurtis Nielson
(74) *Attorney, Agent, or Firm* — Oliff PLC

(57) ABSTRACT

A vehicle seatbelt device that includes: a lap belt that restrains a waist portion of an occupant seated in a vehicle seat; a connection member that connects an end portion of the lap belt with an anchor provided at either a side of the vehicle seat or a location on a vehicle body; a retractor that is provided at a front side of a vehicle relative to the anchor, and that is actuated in a vehicle collision or in a case in which a vehicle collision has been predicted; and a load transmission member that is coupled with the connection member so as to be movable relative to the connection member, and that is retracted by the retractor in a case in which the retractor is actuated.

19 Claims, 12 Drawing Sheets

(56) References Cited

U.S. PATENT DOCUMENTS

2017/0225649 A1* 8/2017 Jaradi ................ B60R 22/1952
2019/0176749 A1* 6/2019 Jaradi ................ B60R 22/1954

FOREIGN PATENT DOCUMENTS

| EP | 2143596 A1 | 1/2010 |
| JP | 2005-349858 A | 12/2005 |
| JP | 2007-153161 A | 6/2007 |
| JP | 2009-161144 A | 7/2009 |
| JP | 2010-013096 A | 1/2010 |
| JP | 2014-046914 A | 3/2014 |
| WO | 03/018374 A1 | 3/2003 |

* cited by examiner

VEHICLE SEATBELT DEVICE

CROSS-REFERENCE TO RELATED APPLICATION

This application is based on and claims priority under 35 USC 119 from Japanese Patent Application No. 2017-195080 filed on Oct. 5, 2017, which is incorporated by reference herein.

BACKGROUND

Technical Field

The present disclosure relates to a vehicle seatbelt device.

Related Art

One hitherto disclosed anchor pretensioner is provided on the vehicle outer side of a vehicle seat. In a vehicle collision, this anchor pretensioner uses two wires to pull a webbing lap belt that restrains the waist of an occupant in a direction angled with respect to the horizontal direction. With this configuration, an acute angle formed between the horizontal direction and the lap belt in vehicle side view is deliberately increased such that the lap belt digs into the waist of the occupant, preventing submarining (see Japanese Patent Application Laid-Open (JP-A) No. 2014-46914).

However, since the direction in which the anchor pretensioner pulls is toward the vehicle lower side, it is difficult to effect a large increase in the angle of the lap belt.

The position of a lap belt anchor for fixing an end portion of the lap belt to, for example, the side of the vehicle seat or to the vehicle floor is stipulated by law. It is therefore difficult to set the position of the lap belt anchor more toward the vehicle front than usual for the purpose of increasing the angle of the lap belt.

A buckle is also provided on the opposite side of the seat to the lap belt anchor in the vehicle width direction. The buckle is coupled to a tongue plate provided to the lap belt when the webbing is put on by an occupant.

Although it is conceivable to employ the vehicle-outer-side anchor pretensioner described above as a pretensioner to pull on the buckle, it would still be difficult to effect a large increase the angle of the lap belt.

Further, from the perspective of ease of tongue plate insertion and removal, the initial position of the buckle cannot be set at the vehicle lower side of the center of the waist of the occupant, and it is therefore difficult to have the lap belt run along the side of the waist of the occupant when the webbing is put on.

SUMMARY

An aspect of the present disclosure is a vehicle seatbelt device that includes: a lap belt that restrains a waist portion of an occupant seated in a vehicle seat; a connection member that connects an end portion of the lap belt with an anchor provided at either a side of the vehicle seat or a location on a vehicle body; a retractor that is provided at a front side of a vehicle relative to the anchor, and that is actuated in a vehicle collision or in a case in which a vehicle collision has been predicted; and a load transmission member that is coupled with the connection member so as to be movable relative to the connection member, and that is retracted by the retractor in a case in which the retractor is actuated.

BRIEF DESCRIPTION OF DRAWINGS

Exemplary embodiments of the present invention will be described in detail based on the following figures, wherein.

DESCRIPTION OF EMBODIMENTS

Figure 1:
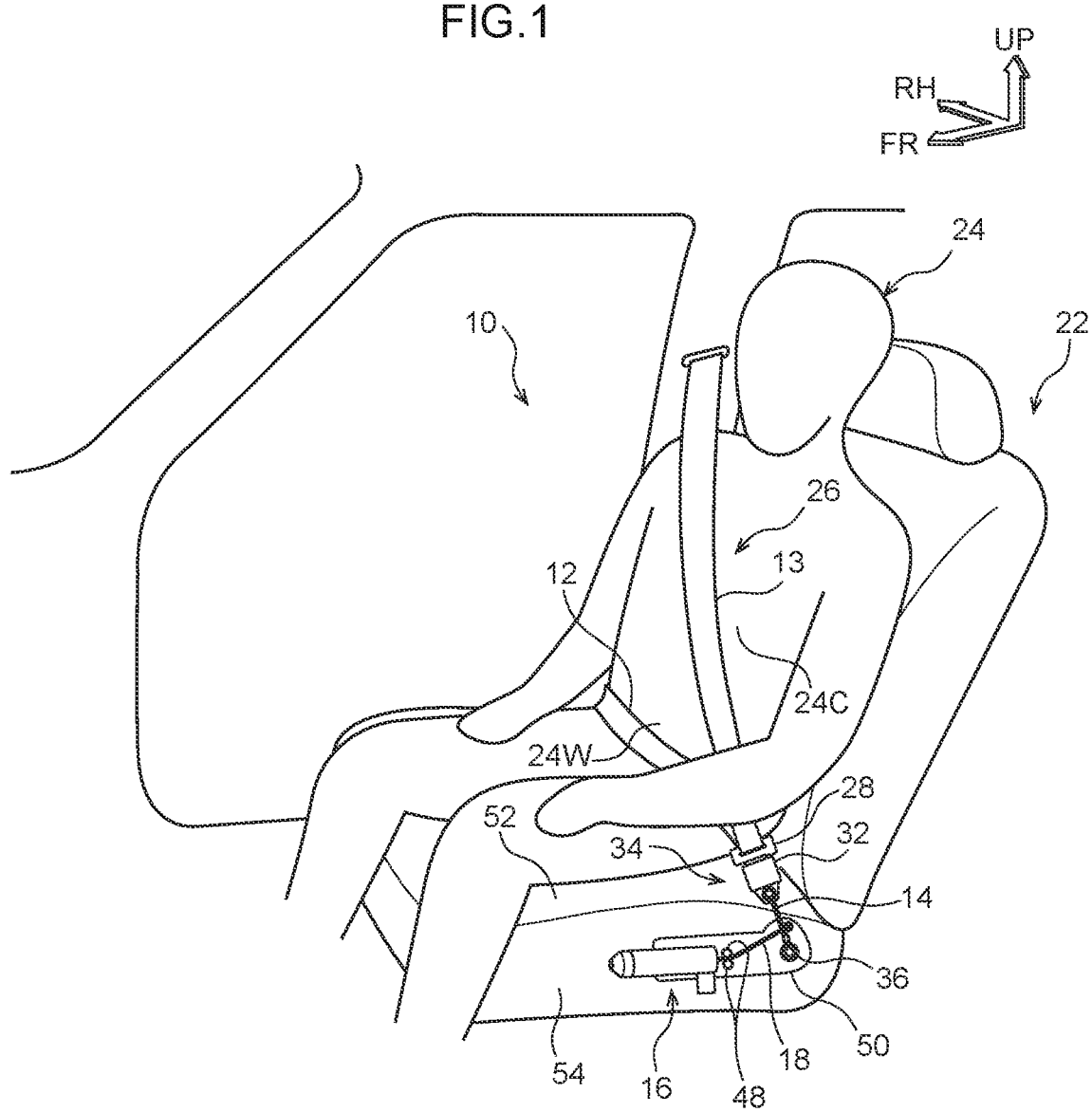
FIG. 1 is a perspective view illustrating a state in which an occupant seated in a vehicle seat is wearing a vehicle seatbelt device according to a first exemplary embodiment.

Explanation follows regarding exemplary embodiments for implementing the present disclosure, with reference to the drawings. In the drawings, the arrow FR indicates the vehicle front, the arrow UP indicates the vehicle upper side, and the arrow RH indicates the vehicle right.

First Exemplary Embodiment

Figure 2:
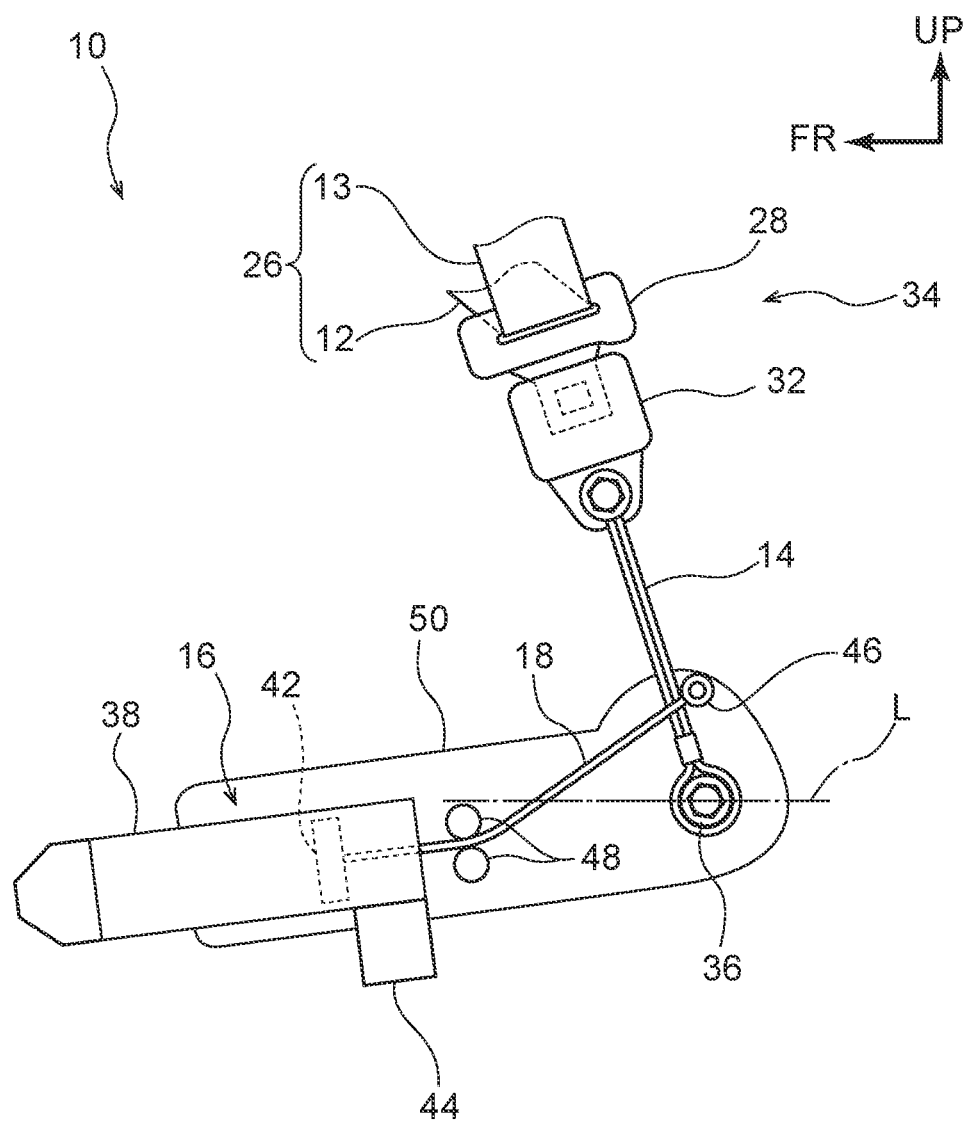
FIG. 2 is a side view illustrating relevant portions of a vehicle seatbelt device according to the first exemplary embodiment.

As illustrated in in FIG. 1 and FIG. 2, a vehicle seatbelt device 10 of a first exemplary embodiment includes a lap belt 12, a buckle wire 14 servings as an example of a connection member, a retractor 16, and a retraction wire 18 serving as an example of a load transmission member.

The lap belt 12 is part of a webbing 26 for restraining the waist 24W of an occupant 24 seated in a vehicle seat 22. The webbing 26 is a flexible and inextensible belt-shaped member. In addition to the lap belt 12, the webbing 26 also includes a shoulder belt 13 for restraining the chest 24C of the occupant 24. A tongue plate 28 is attached to the webbing 26. The tongue plate 28 is coupled to a buckle 32 when the occupant 24 puts on the webbing 26 (when the belt is worn). The buckle 32 is provided at the vehicle width direction inner side of the vehicle seat 22. The webbing 26 is divided into the lap belt 12 and the shoulder belt 13 at the position of the tongue plate 28 when the belt is put on.

The buckle wire 14 in FIG. 2 is a flexible member that connects an end portion 34 of the lap belt 12 to an anchor 36 provided at either the side of the vehicle seat 22 or a location on the vehicle body. The connection member includes the tongue plate 28 and the buckle 32. For example, the buckle wire 14, serving as the connection member, directly connects the buckle 32 and the anchor 36. The buckle wire 14 is rotatably coupled to each of the buckle 32 and the anchor 36. Normally, namely when the retractor 16 has not been actuated, the buckle 32 is positioned at the vehicle upper side and the vehicle front side of the anchor 36.

The retractor 16 is provided at the vehicle front side of the anchor 36, and is, for example, a gas generation type pretensioner that is actuated in a vehicle collision or when a vehicle collision has been predicted. The retractor 16 includes a piston 42 that is provided within a cylinder 38 at a vehicle rear section thereof, and a gas generator 44. Gas is generated by the gas generator 44 when the retractor 16 is actuated, and this gas pressure moves the piston 42 within the cylinder 38 toward the vehicle front.

The retraction wire 18 is coupled to the buckle wire 14 so as to be capable of movement relative thereto. The retraction wire 18 is, for example, a flexible member that is retracted into the retractor 16 when the retractor 16 is actuated. A front end of the retraction wire 18 is coupled to the piston 42. The retraction wire 18 spans the buckle wire 14 so as to be capable of movement relative thereto. A rear end of the retraction wire 18 spanning to the vehicle rear side of the buckle wire 14 may be provided with a guide roller 46. The retraction wire 18 is retracted by the retractor 16 due to movement of the piston 42 toward the vehicle front side when the retractor 16 is actuated. When the retractor 16 has not been actuated, the rear end of the retraction wire 18 is preferably positioned on a lower section of the buckle wire 14. This is so that retraction force from the retraction wire 18 is efficiently transmitted to the buckle wire 14 when the retractor 16 is actuated.

A pair of guides 48 to guide the retraction wire 18 are, for example, provided between the anchor 36 and the retractor 16. The guides 48 are, for example, provided at the vehicle lower side of a horizontal line L that passes through the center of the anchor 36. The guides 48 are, for example, cylindrical guide pins or guide rollers, but may have another configuration so long as they are able to smoothly guide the retraction wire 18.

The anchor 36, the retractor 16, and the guides 48 are attached to an elongated support plate 50. The support plate 50 is fixed to a side frame 54 (see FIG. 1) of a seat cushion 52 of the vehicle seat 22. Using the support plate 50 enhances the ease of assembly of the anchor 36, the retractor 16, and the guides 48 to the vehicle seat 22. The ease of attachment of the anchor 36, the retractor 16, and the guides 48 to the vehicle seat 22 is also enhanced thereby.

Figure 3:
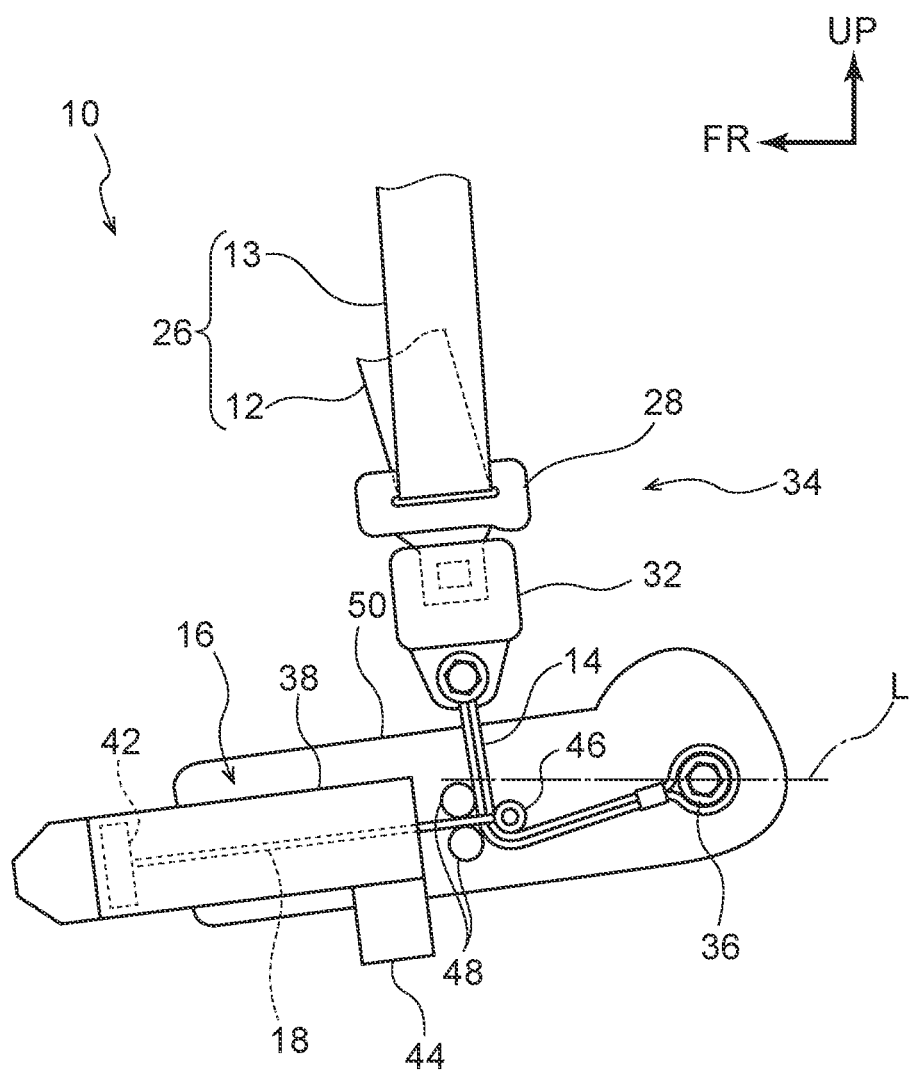
FIG. 3 is a side view illustrating a state in which the retractor in FIG. 2 has been actuated.

In order to increase the retraction efficiency of the retractor 16, an angle formed between the retraction direction of the retractor 16 and the direction along which the retraction wire 18 extends from the guides 48 to the buckle wire 14 is preferably as small as possible. In the present exemplary embodiment, as illustrated in FIG. 2 and FIG. 3, within the limited space of the side frame 54, the axial direction of the cylinder 38 of the retractor 16 is accordingly inclined such that the vehicle front side of the cylinder 38 is below the horizontal line L. The support plate 50 is similarly inclined.

Operation

The present exemplary embodiment is configured as described above. Explanation follows regarding the operation thereof. As illustrated in FIG. 2 and FIG. 3, in the vehicle seatbelt device 10 according to the present exemplary embodiment, the retraction wire 18 is retracted by the retractor 16 provided at the vehicle front of the anchor 36 when the retractor 16 is actuated in a vehicle collision or when a vehicle collision has been predicted. When this occurs, the retraction wire 18 is guided by the guides 48 provided between the anchor 36 and the retractor 16. The retraction wire 18 is thus able to be smoothly retracted in a predetermined direction.

The retraction wire 18 spans the buckle wire 14 so as to be capable of movement relative thereto. The buckle wire 14 connects the buckle 32, serving as the end portion 34 of the lap belt 12, and the anchor 36. Thus, as the retraction wire 18 is retracted by the retractor 16, the buckle wire 14 is pulled toward the vehicle front and the buckle 32 moves toward the vehicle lower side and the vehicle front. In the present exemplary embodiment, using the buckle wire 14 as the connection member simplifies configuration. This enables costs to be reduced with a simple configuration.

Figure 4:
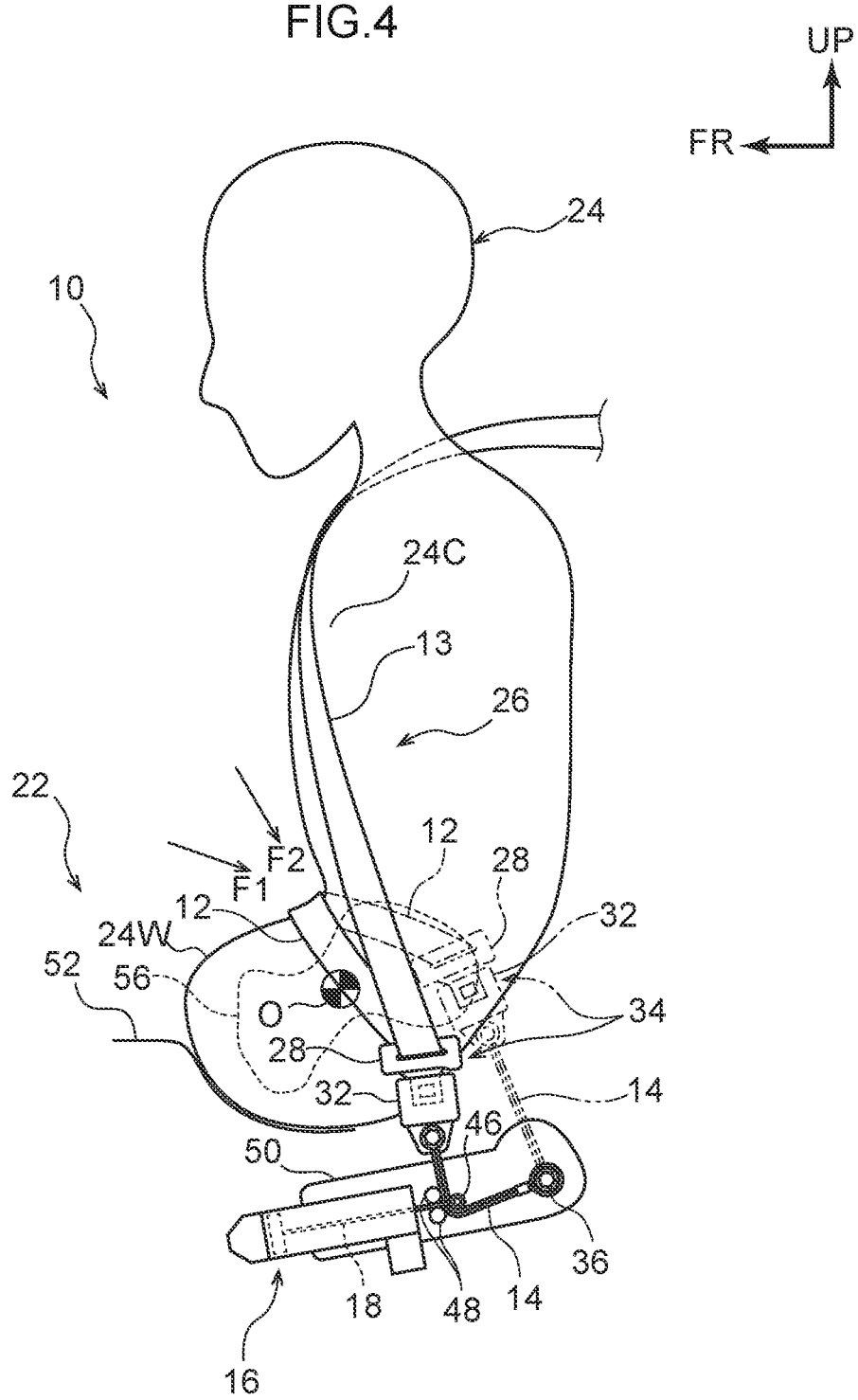
FIG. 4 is a side view illustrating positional relationships between a lap belt and the waist of an occupant before and after retractor actuation.
Figure 5:
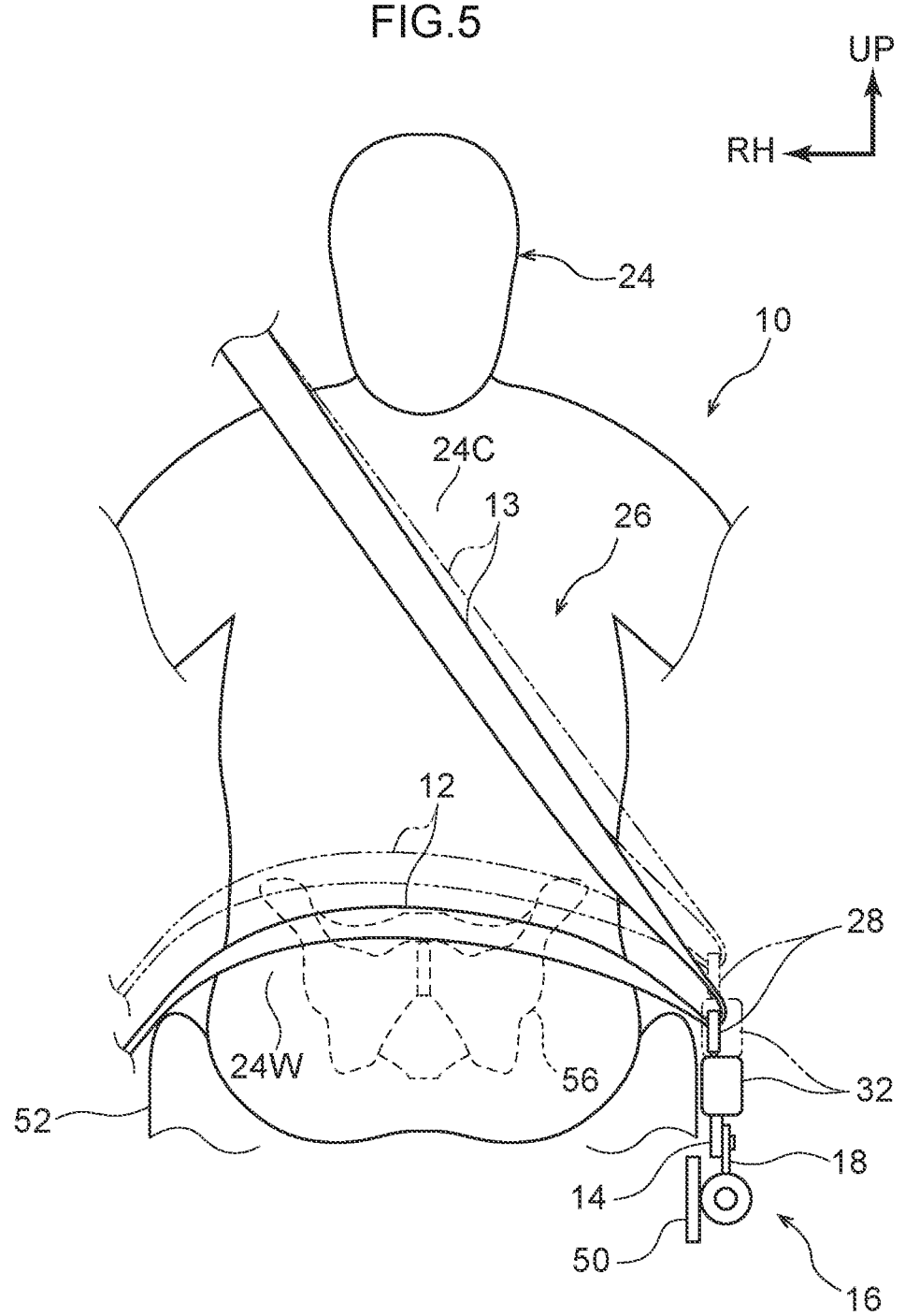
FIG. 5 is a face-on view illustrating positional relationships between a lap belt and the waist of an occupant before and after retractor actuation.

In a state in which the belt is being worn, the tongue plate 28 attached to the lap belt 12 is coupled to the buckle 32, and thus the lap belt 12 also moves in accordance with movement of the buckle 32. Accordingly, as illustrated in FIG. 4, the direction of a tension vector in the lap belt 12 changes from the arrow F1 to the arrow F2, and the direction of the vector either approaches a center O of the waist 24W of the occupant 24 or passes to the vehicle lower-front of the center O of the waist 24W of the occupant 24. Note that in terms of suppressing submarining, the direction of the vector preferably passes to the vehicle lower-front of the center O of the waist 24W of the occupant 24. Further, as illustrated in FIG. 5, the lap belt 12 wraps around the sides of the waist 24W. Note that the center O of the waist 24W is the position of the center of gravity of the pelvis 56 in side view.

As illustrated in FIG. 2 and FIG. 3, the guides 48 are provided at the vehicle lower side of the horizontal line L passing through the center of the anchor 36. The end portion 34 of the lap belt 12 is thus pulled further toward the vehicle lower side when the retractor 16 is actuated. As a result, as illustrated in FIG. 4, the amount the waist 24W of the occupant 24 sinks into the seat cushion 52 of the vehicle seat 22 is increased, and reaction force from the seat cushion 52 is increased. This enables improved restraining force on the waist 24W in the vehicle front-rear direction. Further, by adjusting the position of the guides 48, the retraction characteristics of the end portion 34 of the lap belt 12 can be easily modified.

In the present exemplary embodiment, the buckle 32 thus moves toward the vehicle lower side and the vehicle front in a vehicle collision or when a vehicle collision has been predicted, enabling the waist 24W of the occupant 24 to be efficiently restrained by the lap belt 12.

Second Exemplary Embodiment

Figure 6:
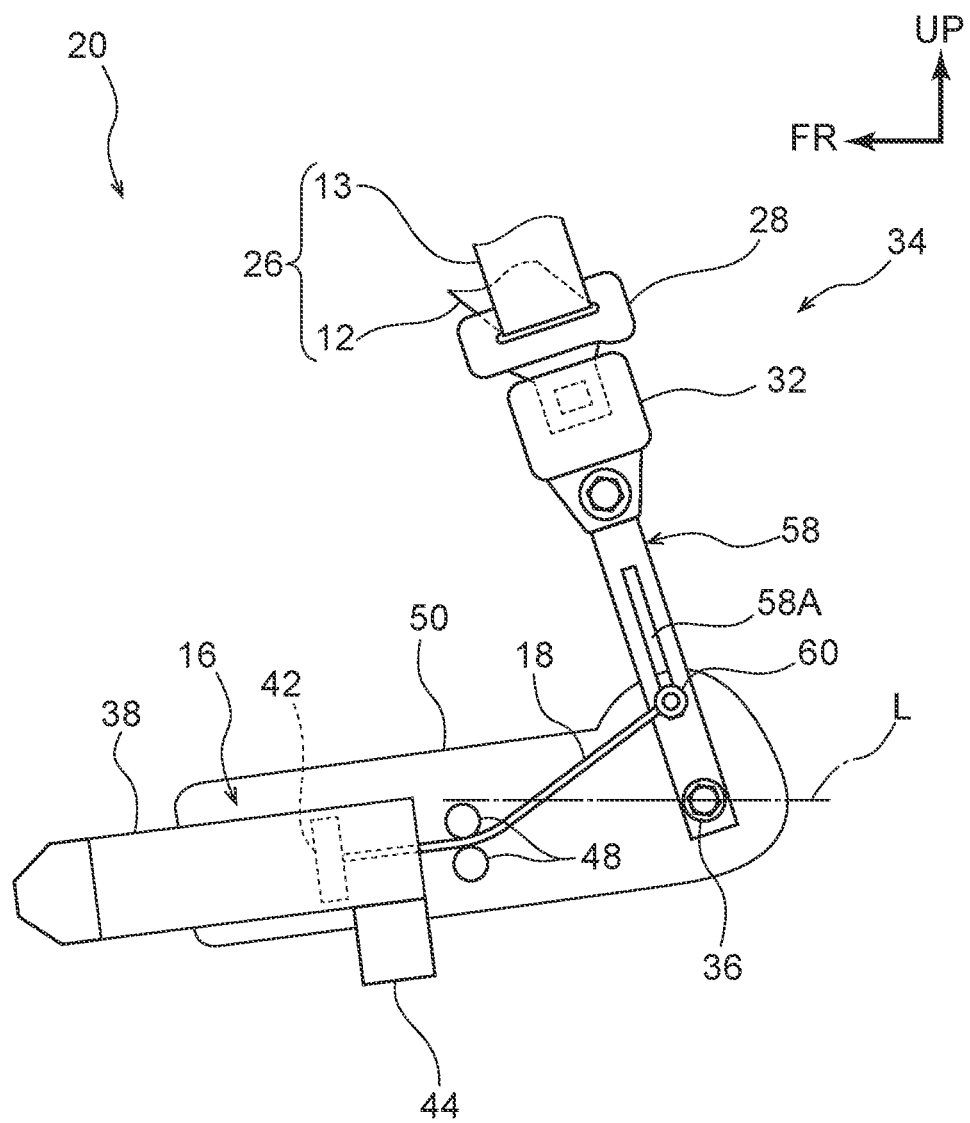
FIG. 6 is a side view illustrating relevant portions of a vehicle seatbelt device according to a second exemplary embodiment.
Figure 7:
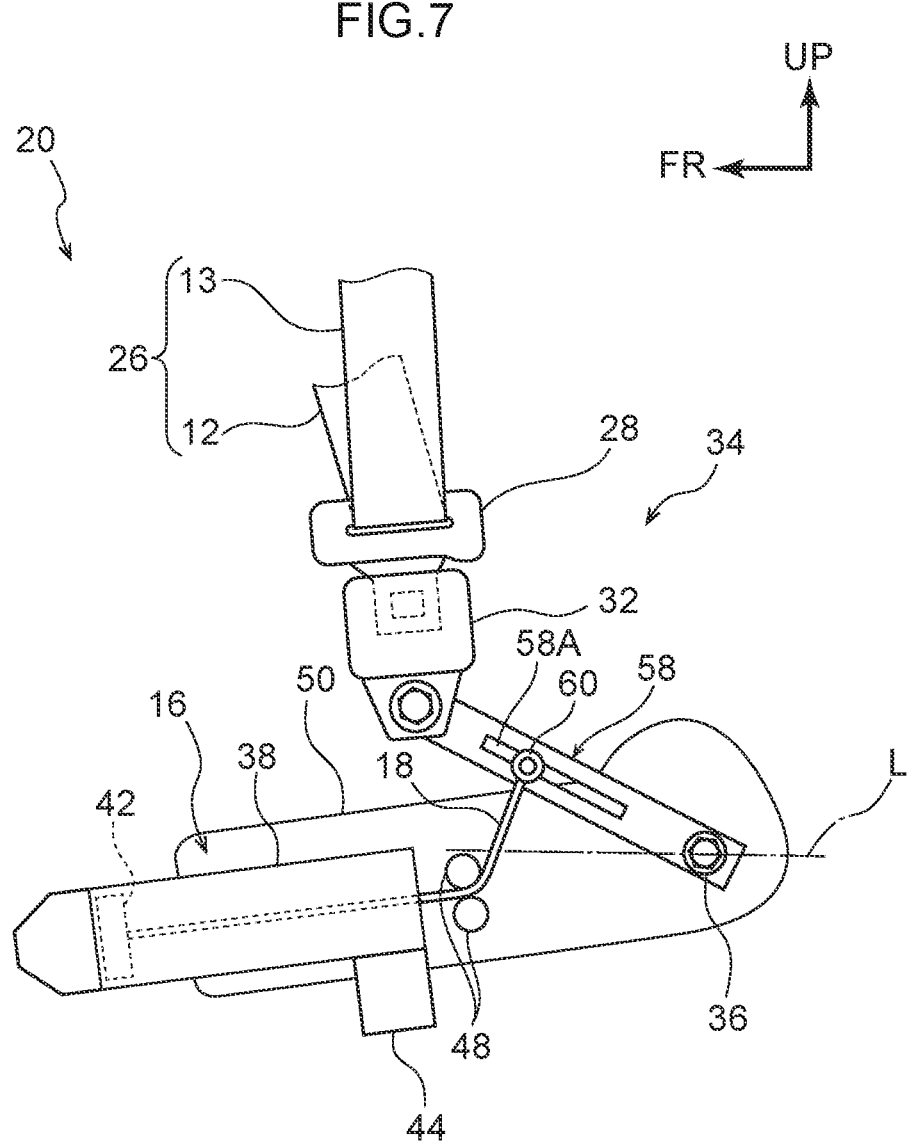
FIG. 7 is a side view illustrating a state in which the retractor in FIG. 6 has been actuated.

As illustrated in FIG. 6 and FIG. 7, a vehicle seatbelt device 20 according to a second exemplary embodiment includes a plate 58, serving as a connection member, in which an elongated hole 58A is formed running along a length direction thereof. An upper end of the plate 58 is rotatably coupled to the buckle 32. A lower end of the plate 58 is rotatably coupled to the anchor 36.

The elongated hole 58A of the plate 58 is, for example, formed with a straight line shape. An end portion 60 of the retraction wire 18 is slidably fit into the plate 58. Namely, the end portion 60 configures a slider with respect to the elongated hole 58A. When the retractor 16 illustrated in FIG. 6 has not been actuated, the end portion 60 of the retraction wire 18 is positioned in a lower end of the elongated hole 58A.

Other portions are similar to those of the first exemplary embodiment. Thus, these portions are allocated the same reference numerals in the drawings, and explanation thereof will not be given.

Operation

The present exemplary embodiment is configured as described above. Explanation follows regarding the operation thereof. As illustrated in FIG. 6 and FIG. 7, in the vehicle seatbelt device 20 according to the present exemplary embodiment, the end portion 60 of the retraction wire 18 is slidably fit into the elongated hole 58A of the plate 58 serving as the connection member. The end portion 60 is positioned in the lower end of the elongated hole 58A. Accordingly, when the retractor 16 is actuated, the plate 58 tilts toward the vehicle front as the retraction wire 18 retracts and the end portion 60 of the retraction wire 18 slides along the elongated hole 58A. The end portion 34 of the lap belt 12, which encompasses the buckle 32 and the tongue plate 28, thereby moves toward the vehicle lower side and the vehicle front. The length direction of the plate 58 and the length of the elongated hole 58A may be adjusted as appropriate. This enables easy adjustment of the retraction characteristics of the retraction wire 18.

In the present exemplary embodiment, the buckle 32 is thus moved toward the vehicle lower side and the vehicle front in a vehicle collision or when a vehicle collision has been predicted, enabling the waist 24W of the occupant 24 to be efficiently restrained by the lap belt 12.

Third Exemplary Embodiment

Figure 8:
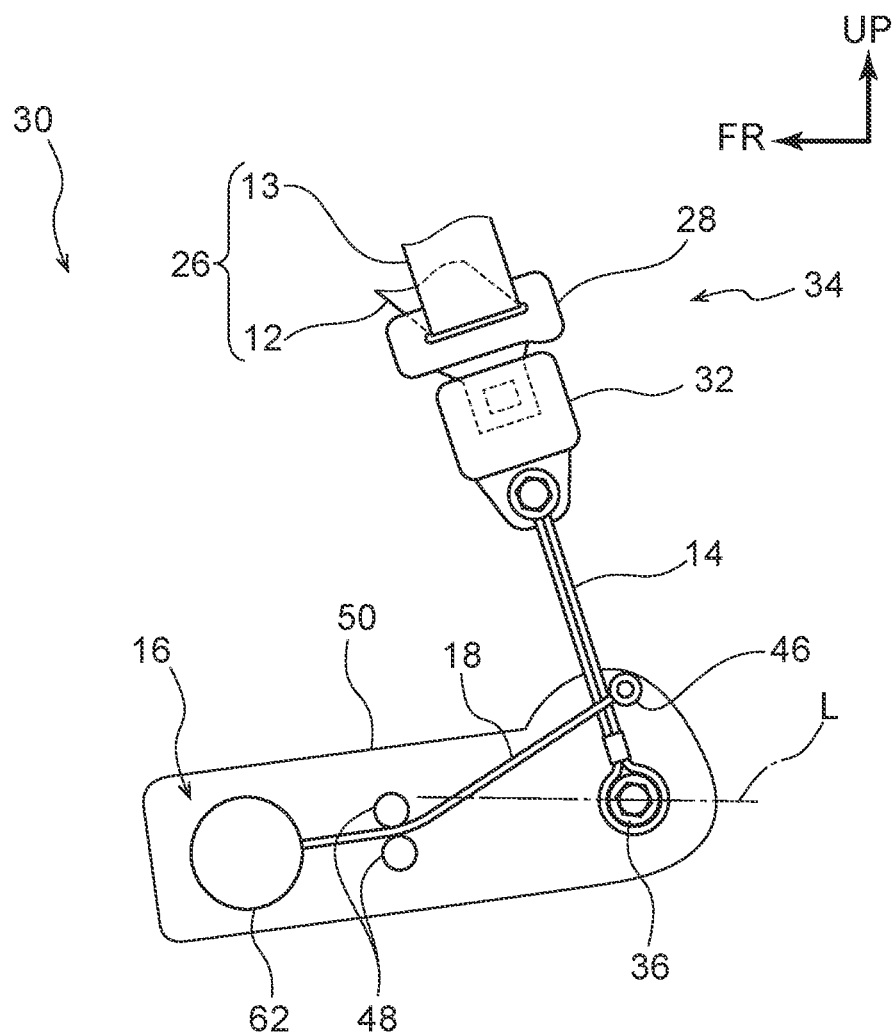
FIG. 8 is a side view illustrating relevant portions of a vehicle seatbelt device according to a third exemplary embodiment.

As illustrated in FIG. 8, in a vehicle seatbelt device 30 according to a third exemplary embodiment, the retractor 16 includes configuration to retract the retraction wire 18 using a drive motor 62. The retraction characteristics of the retraction wire 18 when using the drive motor 62 (line Sm in FIG. 9) are defined by multiplying the movement characteristics of the waist 24W of the occupant 24 in a vehicle collision (line Sp in FIG. 9) by a coefficient.

Figure 9:
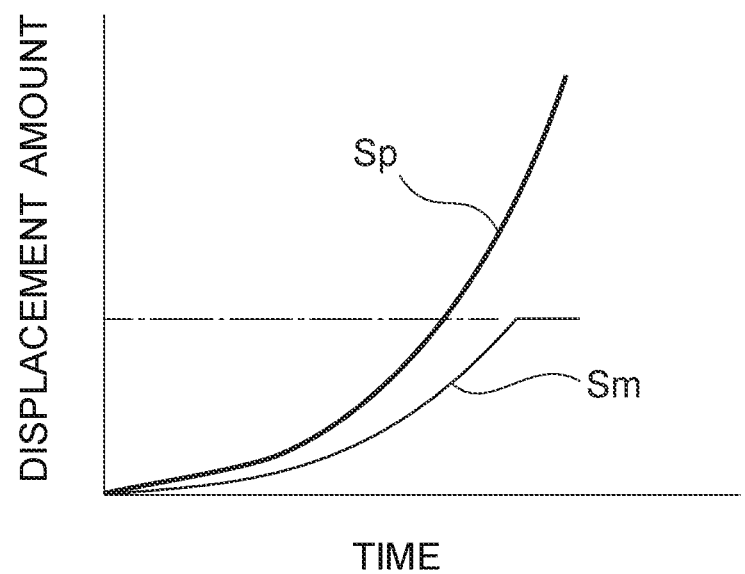
FIG. 9 is a chart respectively illustrating waist movement characteristics and retraction characteristics of a retraction wire.
Figure 10:
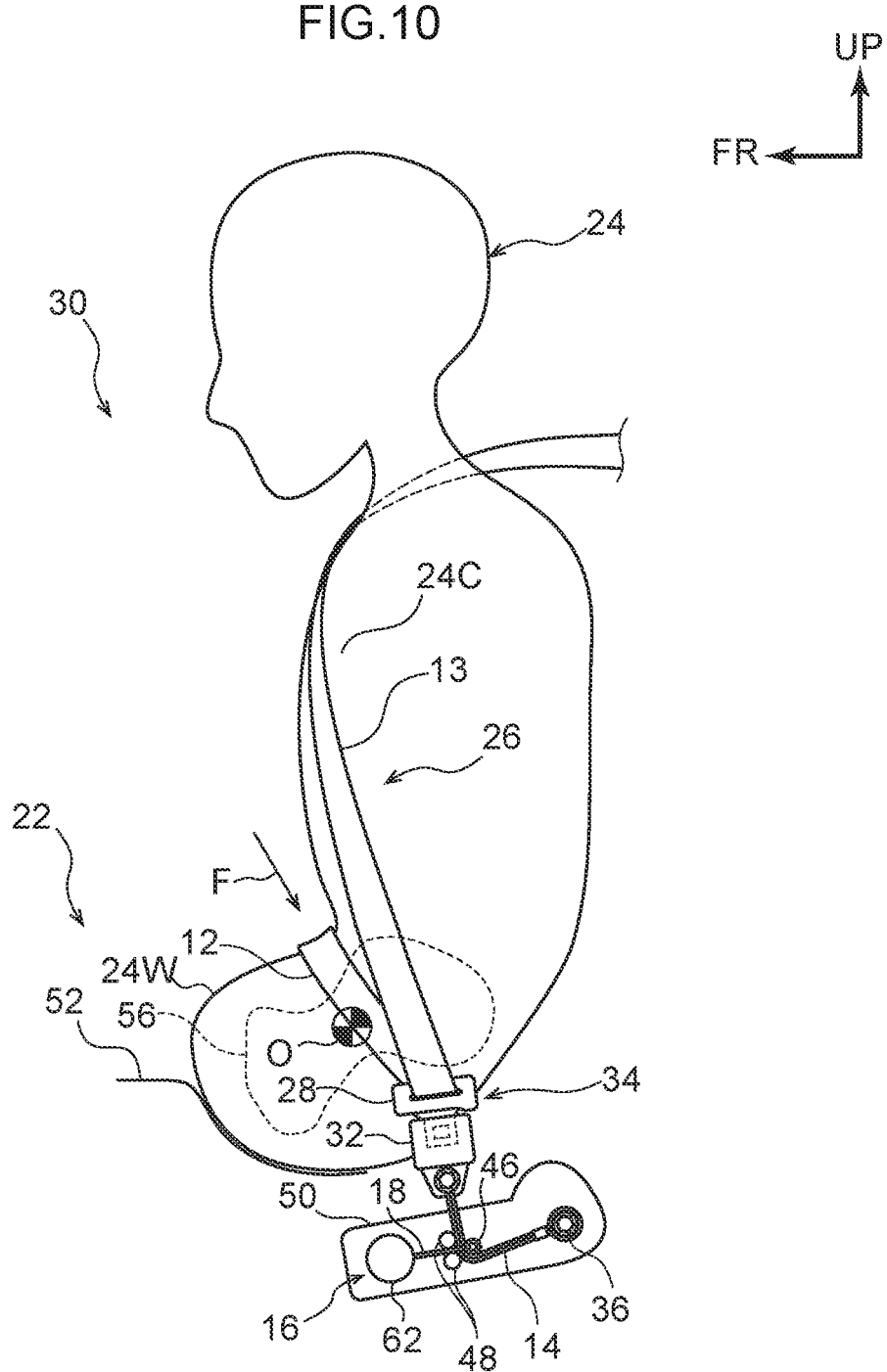
FIG. 10 is a side view illustrating a positional relationship between a lap belt and the waist of an occupant when a retractor has been actuated in the third exemplary embodiment.

FIG. 9 is a chart respectively illustrating the movement characteristics (line Sp) of the waist 24W of the occupant 24 (FIG. 10) and the retraction characteristics (line Sm) of the retraction wire 18 of the retractor 16 (FIG. 8, FIG. 10). The line Sp in FIG. 9 representing the movement characteristics of the waist 24W is calculated by taking the second derivative of the deceleration of the vehicle floor in a vehicle collision. The actual waist 24W is restrained by the lap belt 12, and so the amount of displacement of the waist 24W is restricted to a certain degree. The relationship between the line Sm and the line Sp is defined as Sm=Sp×coefficient. This indicates that the retraction wire 18 is retracted accompanying movement of the waist 24W. Note that the upper limit of the line Sm (the dotted and dashed line in FIG. 9) corresponds to the maximum amount of retraction of the retraction wire 18.

Other portions are similar to those of the first exemplary embodiment. Thus, these are allocated the same reference numerals in the drawings, and explanation thereof will not be given.

Operation

The present exemplary embodiment is configured as described above. Explanation follows regarding the operation thereof. As illustrated in FIG. 10, in the vehicle seatbelt device 30 according to of the present exemplary embodiment, the drive motor 62 is actuated to retract the retraction wire 18 mainly when the retractor 16 is actuated when a vehicle collision has been predicted. The retraction characteristics of the retraction wire 18 when using the drive motor 62 (line Sm in FIG. 9) are defined by multiplying the movement characteristics of the waist 24W of the occupant 24 in a vehicle collision (line Sp in FIG. 9) by a coefficient, enabling the direction of a tension vector in the lap belt 12 (arrow F) to be made to point toward the center O of the waist 24W of the occupant 24, or to point toward the vehicle lower side of the center O of the waist 24W of the occupant 24. This enables more efficient restraint of the waist 24W of the occupant 24 by the lap belt 12 in a vehicle collision.

Fourth Exemplary Embodiment

Figure 11:
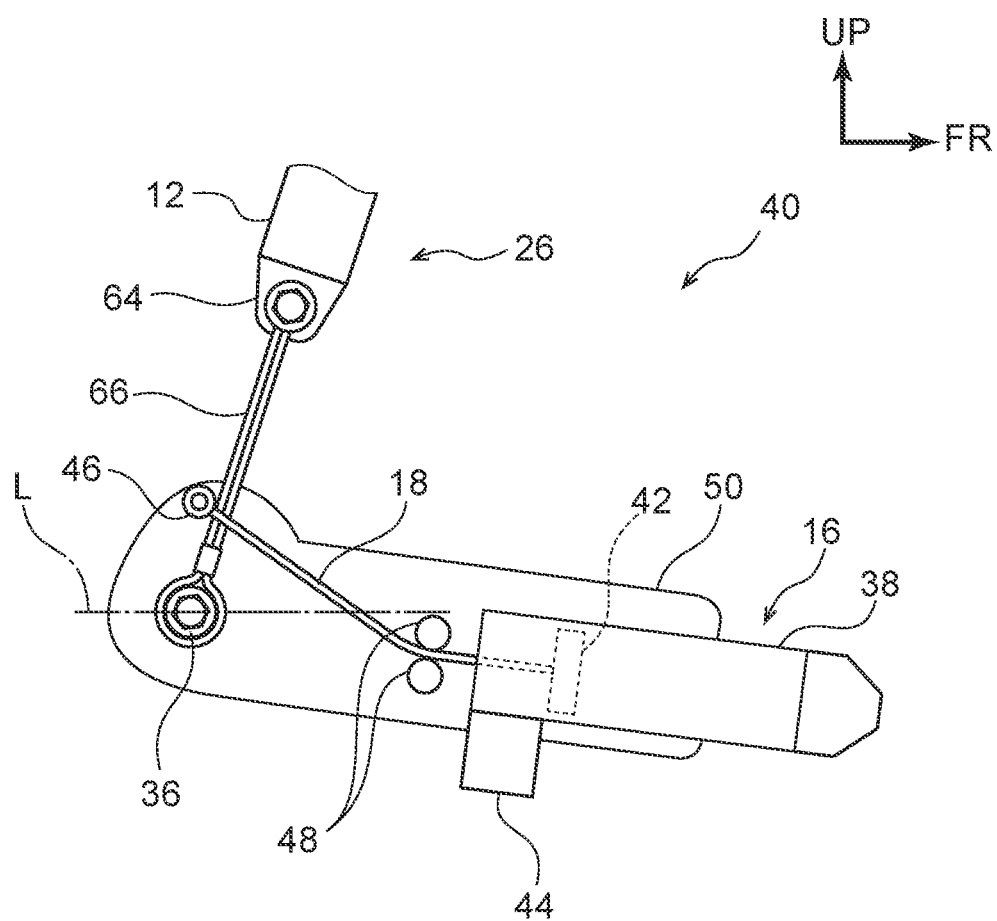
FIG. 11 is a side view illustrating relevant portions of a vehicle seatbelt device according to a fourth exemplary embodiment.
Figure 12:
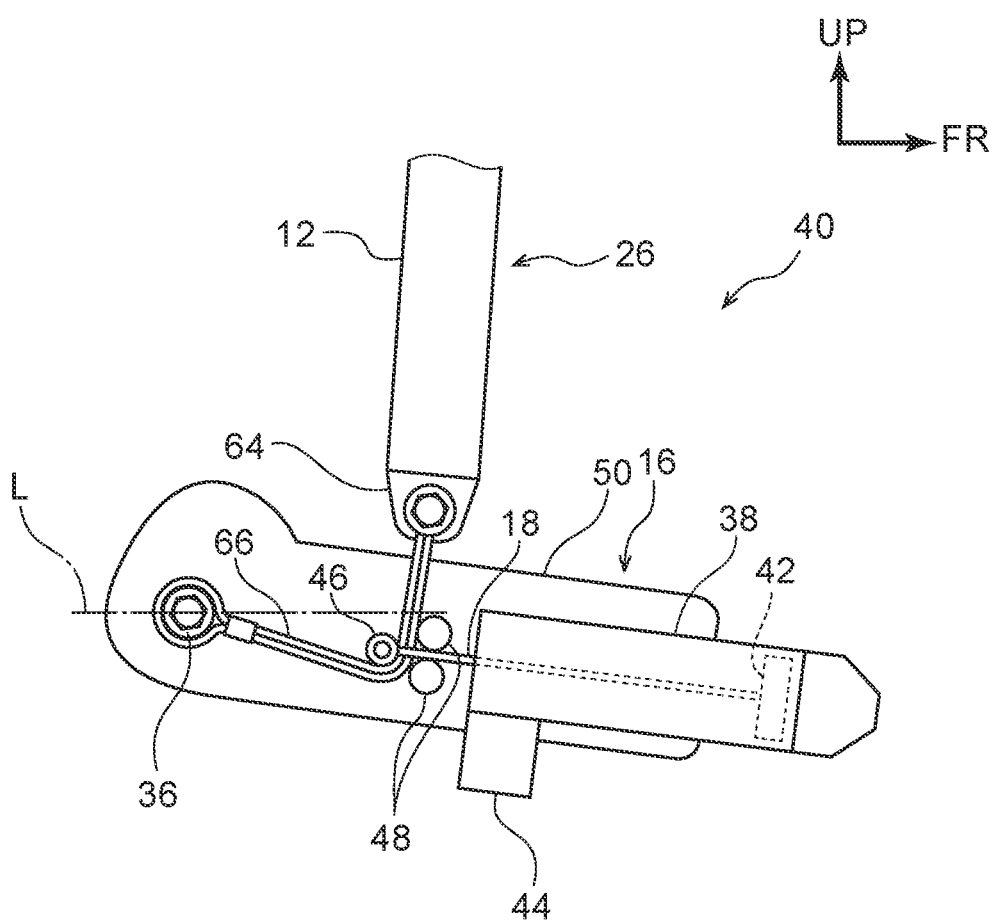
FIG. 12 is a side view illustrating a state in which the retractor in FIG. 11 has been actuated.

In the first to the third exemplary embodiments, the buckle wire 14 is connected to the vehicle width direction inner end portion 34 of the lap belt 12. However, as illustrated in FIG. 11 and FIG. 12, in a vehicle seatbelt device 40 according to a fourth exemplary embodiment, a wire 66 serving as a connection member is directly connected to a vehicle width direction outer end portion 64 of the lap belt 12. The wire 66 is configured similarly to the buckle wire 14 of the first exemplary embodiment.

Other portions are similar to those of the first exemplary embodiment. Thus, these portions are allocated the same reference numerals in the drawings, and explanation thereof will not be given. Note that the connection member is not limited to the wire 66, and may be a member similar to the plate 58 (of the second exemplary embodiment). Further, the retractor 16 is not limited to being a gas generation type pretensioner, and may be a pretensioner that employs a drive motor.

Operation

The present exemplary embodiment is configured as described above. Explanation follows regarding the operation thereof. As illustrated in FIG. 11 and FIG. 12, in the vehicle seatbelt device 40 according to the present exemplary embodiment, the retraction wire 18 is retracted by the retractor 16 provided at the vehicle front side of the anchor 36 when the retractor 16 is actuated in a vehicle collision or when a vehicle collision has been predicted. In accordance therewith, the wire 66 is pulled toward the vehicle front, and the end portion 64 of the lap belt 12 moves toward the vehicle lower side and the vehicle front. Similarly to the other exemplary embodiments, the waist 24W of the occupant 24 is thereby able to be efficiently restrained by the lap belt 12.

Other Exemplary Embodiments

Explanation has been given regarding example exemplary embodiments of the present disclosure. However, exemplary embodiments of the present disclosure are not limited to those described above, and obviously various other modifications may be implemented within a range not departing from the spirit of the present disclosure. Exemplary embodiments may also be combined as appropriate.

Although the buckle wire 14 is configured as a flexible member in the first exemplary embodiment, the buckle wire 14 may be a member with substantially no flexibility. In such cases, the buckle wire 14 is would be tilted toward the vehicle front similarly to the plate 58 of the second exemplary embodiment when the retractor 16 is actuated.

Further, although the retraction wire 18 is given as an example of the load transmission member, the load transmission member is not limited to a wire. The load transmission member may be a shaft member or the like.

In cases in which there is no need to guide retraction of the retraction wire 18, configuration may be such that the guides 48 are not provided. Further, although the guides 48 are provided at the vehicle lower side of the horizontal line L passing through the center of the anchor 36, the guides 48 may be provided at a position at or above the height of the horizontal line L.

Further, although the anchor 36, the retractor 16, and the guides 48 are attached to the elongated support plate 50, each of these may be installed so as to be separate from the others.

A first aspect is a vehicle seatbelt device that includes: a lap belt that restrains a waist portion of an occupant seated in a vehicle seat; a connection member that connects an end portion of the lap belt with an anchor provided at either a side of the vehicle seat or a location on a vehicle body; a retractor that is provided at a front side of a vehicle relative to the anchor, and that is actuated in a vehicle collision or in a case in which a vehicle collision has been predicted; and a load transmission member that is coupled with the connection member so as to be movable relative to the connection member, and that is retracted by the retractor in a case in which the retractor is actuated.

In this vehicle seatbelt device, the load transmission member is retracted by the retractor when the retractor is actuated in a vehicle collision or when a vehicle collision has been predicted. The retractor is provided at the vehicle front side of the anchor, and the load transmission member is coupled to the connection member, which connects the end portion of the lap belt to the anchor, so as to be capable of movement relative to the connection member. Thus, as the load transmission member is retracted by the retractor, the connection member is also pulled toward the vehicle front. As a result, the end portion of the lap belt moves toward the vehicle lower side and the vehicle front, and so the direction of a tension vector in the lap belt either approaches a center of the waist of the occupant or passes to the vehicle lower-front of the center of the waist, and the lap belt wraps around the sides of the waist.

A second aspect is the vehicle seatbelt device of the first aspect, further comprising a guide that guides the load transmission member, the guide being provided between the anchor and the retractor.

In this vehicle seatbelt device, the load transmission member is guided by the guide provided between the anchor and the retractor when the load transmission member is retracted by the retractor. Further, by adjusting the position of the guide, the retraction characteristics of the end portion of the lap belt can be easily modified.

A third aspect is the vehicle seatbelt device of the second aspect, wherein the guide is provided at a lower side of the vehicle than a horizontal line passing through a center of the anchor.

In this vehicle seatbelt device, the guide is provided at the vehicle lower side of a horizontal line passing through the center of the anchor. The end portion of the lap belt is thus pulled further toward the vehicle lower side when the retractor is actuated. As a result, the amount the waist of the occupant sinks into the seat cushion of the vehicle seat is increased, and reaction force from the seat cushion is increased.

A fourth aspect is the vehicle seatbelt device of the second or the third aspect, wherein the anchor, the retractor, and the guide are attached to an elongated support plate, the support plate being fixed to a side frame of a seat cushion of the vehicle seat.

In this vehicle seatbelt device, using the support plate gives good ease of assembly of the anchor, the retractor, and the guide to the vehicle seat.

A fifth aspect is the vehicle seatbelt device of the second or the third aspect, wherein: the retractor retracts the load transmission member using a drive motor; and retraction characteristics of the load transmission member with the drive motor are defined by multiplying movement characteristics of the waist portion of the occupant in a vehicle collision by a coefficient.

In this vehicle seatbelt device, the drive motor is actuated to retract the load transmission member mainly when the retractor is actuated when a vehicle collision has been predicted. The retraction characteristics of the load transmission member when using the drive motor are defined by multiplying the movement characteristics of the waist of the occupant in a vehicle collision by the coefficient, enabling the direction of a tension vector in the lap belt to be made to point toward the center of the waist of the occupant, or to point toward the vehicle lower side of the center of the waist.

A sixth aspect is the vehicle seatbelt device of any of the first to the fifth aspects, wherein: the connection member includes a wire; and the load transmission member is disposed so as to be movable relative to the wire.

In this vehicle seatbelt device, the load transmission member spans the wire so as so as to be capable of movement relative to the wire serving as the connection member. Thus, when the retractor is actuated, the wire serving as the connection member is pulled toward the vehicle front as the load transmission member retracts. The end portion of the lap belt thereby moves toward the vehicle lower side and the vehicle front. Using the wire as the connection member simplifies configuration.

A seventh aspect is the vehicle seatbelt device of any of the first to the fifth aspects, wherein: the connection member includes a plate having an elongated hole along a length direction; and an end portion of the load transmission member is slidably fit into the elongated hole.

In this vehicle seatbelt device, the end portion of the load transmission member is slidably fit into the elongated hole of the plate serving as the connection member. Accordingly, when the retractor is actuated, the plate tilts toward the vehicle front as the load transmission member retracts and the end portion of the load transmission member slides along the elongated hole. The end portion of the lap belt thereby moves toward the vehicle lower side and the vehicle front. The length direction of the plate and the length of the elongated hole may be adjusted as appropriate.

An eighth aspect is the vehicle seatbelt device of any of the first to the seventh aspects, wherein the connection member includes: a tongue plate that is attached to the lap belt, and a buckle from which the tongue plate is detachable.

In this vehicle seatbelt device, the buckle serving as the connection member moves toward the vehicle lower side and the vehicle front when the retractor is actuated. In a state in which the belt is being worn, the tongue plate attached to the lap belt is coupled to the buckle, and thus the end portion of the lap belt also moves in accordance with movement of the buckle. Accordingly, the direction of a tension vector in the lap belt either approaches a center of the waist of the occupant or passes to the vehicle lower-front of the center of the waist, and the lap belt wraps around the sides of the waist.

The vehicle seatbelt device according to the first aspect enables the waist of the occupant to be efficiently restrained by the lap belt in a vehicle collision or when a vehicle collision has been predicted.

The vehicle seatbelt device according to the second aspect enables the load transmission member to be smoothly retracted in a predetermined direction.

The vehicle seatbelt device according to the third aspect enables improved restraining force on the waist in the vehicle front-rear direction.

The vehicle seatbelt device according to the fourth aspect enables the ease of attachment of the anchor, the retractor, and the guide to the vehicle seat to be enhanced.

The vehicle seatbelt device according to the fifth aspect enables more efficient restraint of the waist of the occupant by the lap belt in a vehicle collision.

The vehicle seatbelt device according to the sixth aspect enables costs to be reduced with a simple configuration.

The vehicle seatbelt device according to the seventh aspect enables easy adjustment of the retraction characteristics of the load transmission member.

With the vehicle seatbelt device according to the eighth aspect, the buckle is moved toward the vehicle lower side and the vehicle front in a vehicle collision or when a vehicle collision has been predicted, enabling the waist of the occupant to be efficiently restrained by the lap belt.

What is claimed is:

1. A vehicle seatbelt device, comprising:
a lap belt that restrains a waist portion of an occupant seated in a vehicle seat;
a connection member that connects an end portion of the lap belt with an anchor provided at either a side of the vehicle seat or a location on a vehicle body;
a retractor that is at a front side of a vehicle relative to the anchor, and that is actuated in a vehicle collision or in a case in which a vehicle collision has been predicted;
a load transmission member that is coupled with the connection member to be movable relative to the connection member, and that is retracted by the retractor in a case in which the retractor is actuated; and
a pair of guides between the anchor and the retractor, wherein the load transmission member is between the pair of guides to be held and guided by the pair of guides.

2. The vehicle seatbelt device of claim 1, wherein the pair of guides are at a lower side of the vehicle than a horizontal line passing through a center of the anchor.

3. The vehicle seatbelt device of claim 2, wherein the retractor includes a cylinder, an axial direction of the cylinder being inclined such that a vehicle front side of the cylinder is lower than the horizontal line.

4. The vehicle seatbelt device of claim 1, wherein the anchor, the retractor, and the pair of guides are attached to an elongated support plate, the support plate being fixed to a side frame of a seat cushion of the vehicle seat.

5. The vehicle seatbelt device of claim 1, wherein:
the retractor retracts the load transmission member using a drive motor; and
retraction characteristics of the load transmission member with the drive motor are defined by multiplying movement characteristics of the waist portion of the occupant in a vehicle collision by a coefficient.

6. The vehicle seatbelt device of claim 1, wherein:
the connection member includes a wire; and
the load transmission member is disposed so as to be movable relative to the wire.

7. The vehicle seatbelt device of claim 1, wherein:
the connection member includes a plate having an elongated hole along a length direction; and
an end portion of the load transmission member is slidably fit into the elongated hole.

8. The vehicle seatbelt device of claim 1, wherein the connection member includes:
a tongue plate that is attached to the lap belt, and
a buckle from which the tongue plate is detachable.

9. The vehicle seatbelt device of claim 1, wherein the pair of guides comprises a pair of cylindrical guide pins or a pair of guide rollers.

10. A vehicle seatbelt device, comprising:
a lap belt that restrains a waist portion of an occupant seated in a vehicle seat;
a connection member that connects an end portion of the lap belt with an anchor at either a side of the vehicle seat or a location on a vehicle body;
a retractor that is at a front side of a vehicle relative to the anchor, and that is actuated in a vehicle collision or in a case in which a vehicle collision has been predicted; and
a load transmission member with a rear end that is connected to the connection member so that the rear end is movable relative to the connection member, wherein the load transmission member is retracted by the retractor in a case in which the retractor is actuated, and wherein the rear end is an end portion of the load transmission member that is most rearward in a longitudinal direction of the vehicle.

11. The vehicle seatbelt device of claim 10, further comprising a guide that guides the load transmission member, the guide being between the anchor and the retractor.

12. The vehicle seatbelt device of claim 11, wherein the guide is at a lower side of the vehicle than a horizontal line passing through a center of the anchor.

13. The vehicle seatbelt device of claim 12, wherein the retractor includes a cylinder, an axial direction of the cylinder being inclined such that a vehicle front side of the cylinder is lower than the horizontal line.

14. The vehicle seatbelt device of claim 11, wherein the anchor, the retractor, and the guide are attached to an elongated support plate, the support plate being fixed to a side frame of a seat cushion of the vehicle seat.

15. The vehicle seatbelt device of claim 11, wherein:
the retractor retracts the load transmission member using a drive motor; and
retraction characteristics of the load transmission member with the drive motor are defined by multiplying movement characteristics of the waist portion of the occupant in a vehicle collision by a coefficient.

16. The vehicle seatbelt device of claim 10, wherein:
the connection member includes a wire; and
the load transmission member is disposed so as to be movable relative to the wire.

17. The vehicle seatbelt device of claim 10, wherein:
the connection member includes a plate having an elongated hole along a length direction; and
an end portion of the load transmission member is slidably fit into the elongated hole.

18. The vehicle seatbelt device of claim 10, wherein the connection member includes:
a tongue plate that is attached to the lap belt, and
a buckle from which the tongue plate is detachable.

19. The vehicle seatbelt device of claim 10, wherein the guide is a cylindrical guide pin or a guide roller.

* * * * *